United States Patent [19]

Niehus et al.

[11] 3,895,787
[45] July 22, 1975

[54] RAILWAY AIR SPRING BELLOWS

[75] Inventors: Gunther Niehus; Hartwig Voss, both of Hannover, Germany

[73] Assignee: Continental Gummi-Werke Aktiengesellschaft, Hannover, Germany

[22] Filed: Feb. 23, 1972

[21] Appl. No.: 228,510

[30] Foreign Application Priority Data
Feb. 24, 1971 Germany.......................... 2108694

[52] U.S. Cl................ 267/3; 105/197 B; 105/453; 152/162 R; 267/65 A; 267/65 B
[51] Int. Cl........... B61f 5/10; F16f 9/04; F16f 9/54
[58] Field of Search............ 105/185, 197 B, 199 S, 105/453; 267/3, 4, 65 A, 65 B; 152/162 R

[56] References Cited
UNITED STATES PATENTS

| | | | |
|---|---|---|---|
| 809,530 | 1/1906 | Sankey............................ | 152/362 R |
| 1,401,148 | 12/1921 | Fording............................ | 152/356 |
| 1,428,571 | 9/1922 | Wayne........................ | 152/362 R X |
| 2,288,383 | 6/1942 | Anderson........................... | 105/185 |
| 2,757,701 | 8/1956 | Henson........................ | 152/362 R X |
| 2,822,017 | 2/1958 | Herzegh.......................... | 152/362 R |
| 2,848,956 | 8/1958 | Deist................................ | 105/199 S |
| 2,920,885 | 1/1960 | Niclas............................... | 267/65 A |
| 2,922,637 | 1/1960 | Bowser et al.............. | 152/362 R X |
| 3,111,976 | 11/1963 | Delobelle........................ | 152/362 R |
| 3,612,138 | 10/1971 | Ravenhall ...................... | 152/362 R |
| 3,638,705 | 2/1972 | Devienne et al............. | 152/362 R X |

*Primary Examiner*—M. Henson Wood, Jr.
*Assistant Examiner*—Howard Beltran
*Attorney, Agent, or Firm*—Walter Becker

[57] ABSTRACT

An air spring bellows, especially for supporting the vehicle box of rail vehicles on cradle-free bogies, in the form of a hollow body of revolution, the generatrix of which cross-sectionally has a continuous curvature different from a circular line, while the outer diameter of one annular bead of said bellows, which bead has a shorter diameter than an oppositely located bead on the bellows, equals at least the outer diameter of the abutment ring of the vehicle to which it is to be connected, the bellows having strength members embedded therein whose free ends are folded from the outwardly directed side of the beads over the core ring toward the inwardly facing side of the beads.

1 Claim, 8 Drawing Figures

PATENTED JUL 22 1975 3,895,787

RAILWAY AIR SPRING BELLOWS

The present invention relates to air bellows, especially for supporting the car body of rail vehicles on trucks or bogies, which air bellows have the shape of bodies of revolution with annular beads of different diameters which are firmly connected to rigid abutment rings on vehicle parts which are cushioned relative to each other, core rings being embedded in said annular beads which are surrounded by embedded strength carriers extending between said annular beads.

The cushioning ability and property of the rubber bellows in vehicle air springs can be influenced by the control of the inner pressure and above all by the design and the course of the embedded strength carriers. These structural features which are also influential with regard to the shape of the bellows practically act exclusively in axial direction with regard to the vehicle, in other words, in vertical direction, upon the characteristic of the air spring, whereas for the equalization of the horizontally directed shearing forces, additionally mechanical guiding means are necessary.

When the specific application of air bellows with regard to rail vehicles is involved, the lateral instability of the air spring bellows causes undesired rim pressures with an inherent higher wear. By the introduction of the so-called semi or one-fold bellows, which in most instances have different bead ring diameters and as a reaction to lateral deviations or distortions generate returning forces, considerable simplifications in the construction of the bogies and generally of the understructure have been realized, and the rim pressures could be held in admissible limits. Experience has proved, however, that bellows of this type, in spite of an otherwise satisfactory spring or cushioning behavior do not withstand continuous stresses in operation over a longer period of time. In the construction of the layers of the walls of the bellows, particularly in the critical merging regions, with the stationary annular end beads, tears and fabric detachments were encountered which resulted in a premature failure of the respective air bellows and repeatedly required expensive exchange operations.

It is, therefore, an object of the present invention to provide improved air spring bellows which will overcome the above mentioned drawbacks and will have a considerably longer useful life than air bellows of the type heretofore known.

These objects and other objects and advantages of the invention will appear more clearly from the following specification, in connection with the accompanying drawing, in which.

Figure 1:
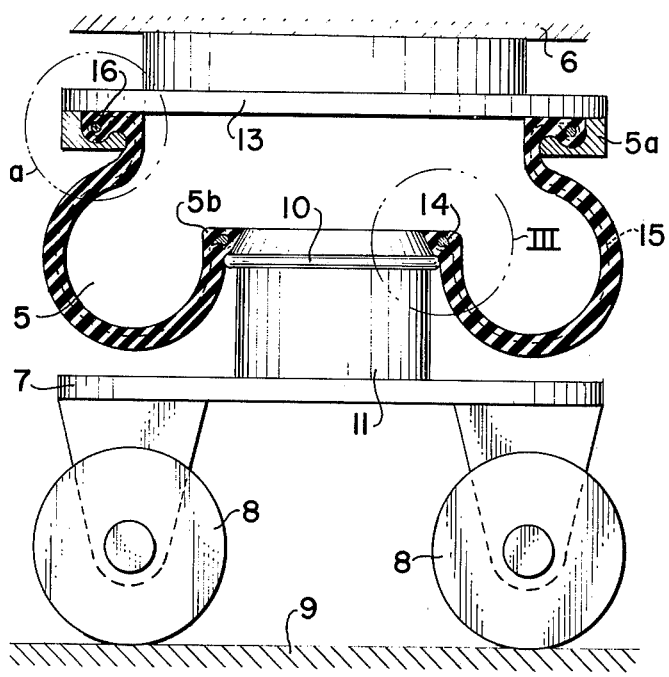
FIG. 1 illustrates partially in section the assembly of an air bellows in a rail vehicle.
Figure 1A:
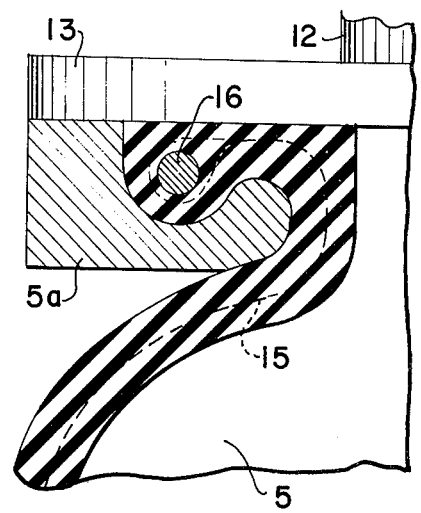
FIG. 1a is an enlarged section of the encircled portion Ia of FIG. 1.

The air bellows according to the present invention is characterized primarily by a combination of the following features:
 a. The generatrix for the body of revolution has a shape which is different from a circle and has a continuous curvature.
 b. The outer diameter of the core ring embedded in the smaller annular bead equals at least the outer diameter of the associated abutment ring.
 c. The free ends of the strength members in the smaller annular bead extend around the core ring at that side which faces the abutment ring.

The invention is based on the finding that the cross-sectional shape of the torous-shaped bellows body is of importance in combination with the particular installation and tension conditions, in particular of the smaller annular bead which, as a rule, is associated with the bogie. While the heretofore known suggestions for the bellows which is under pressure and in its rest position, in other words, is not deviated, call for a circular shape, the present invention fundamentally deviates from this design, inasmuch as it requires a continuous curved course of the contour edges with the specific exception of the circular arc which has been found to be disadvantageous.

In practice all conic sections in other planes but that perpendicular to the axis, as for instance ellipses or parabolae, are applicable and in addition thereto also other curves follow other laws. By arranging and angularly aligning the reinforcing inserts, the desired cross-sectional shape may be obtained. The advantages of such construction show up in the course of the rolling movement of the bellows wall during a vertical spring movement, which course is determined by the curvature of the curve, and also show up with the lateral deviations. On the other hand, this course of the rolling movement of the bellows walls is not isolated by itself, but is in close relationship to the determination of the smaller bead ring on the bogie which is angularly movable relative to the car body. The adaptation of the core ring to the rigid abutment ring of the holding means, which abutment ring is frequently termed "rim horn", will together with the particular loop formation of the thread-shaped strength members within the region in the bead ring and therebeyond assure a firm and simultaneously angularly moving seat which follows the changes in the direction of the adjacent wall portions during the rollingoff movement. The arrangement of the thread ends according to the present invention which in complete contrast to heretofore prevailing opinions is placed upon the outer side of the core ring, expediently while an adherent connection is established with said core ring, makes possible a stretched rectilinear course of the strength carriers which are under pulling stress, in the critical range of the rim horn and avoids the occurrence of harmful local tension peaks. Instead of an adhering connection or additionally thereto, it is also possible to introduce the free ends of the strength members in group or stacked manner of different length steps, beyond the range of the rim horn into the walls of the bellows in order to realize a desired gradual power transfer of forces for the intended compensation of tensions or stresses.

The total action complex is furthermore supplemented by the influence of the core ring itself, which makes itself felt by its cross-sectional configuration. In distinction to pneumatic vehicle tires for which at always constant mutual distance, the fixed installation position of the tire beads is characteristic, it is of decisive importance how the core rings in the air bellows are designed and shaped. This is of importance for the dynamic behavior under load.

According to a further development of the invention therefore, especially for the core ring of the smaller annular bead, there is provided a longitudinally rounded, for instance, elliptical kidney-shaped or drop-shaped cross-sectional configuration. In this way, instead of trapezoidal or simple circular round cross-sectional shapes, a better guiding of the loops is realized and simultaneously a closer adaptation to the installation conditions given by the diameter conditions according to the invention of the core ring with regard to the pertaining abutment ring or rim horn.

Referring now to the drawing in detail, FIG. 1 shows an air bellows 5 which is inserted between the car body 6 and the bogie 7 of a railway car. The spring bellows is made of rubber or rubberlike synthetic materials with embedded reinforcing inserts in the form of fabrics, individual threads extending parallel to each other, or the like, and has the shape of a body of revolution with a larger annular bead 5a facing the car box and with a smaller annular bead 5b facing the bogie. The cross-sectional surface which generates the body of revolution of the spring bellows clearly deviates or differs from the circular shape. The bogie 7, which by means of two wheel sets 8 is adapted to roll on rails 9, is designed without the cradle which is required for the heretofore customary spring systems, and on its cylindrical upright supporting body 11 carries a rim horn 10 forming a rigid abutment ring against which the smaller annular bead 5b of the spring bellows rests from the outside in pressure-tight engagement. Similarly, also the greater annular bead 5a of the spring bellows rests against an abutment ring 13 which is mounted on a supporting body 12 and fixed to the vehicle box 6.

Figure 2:
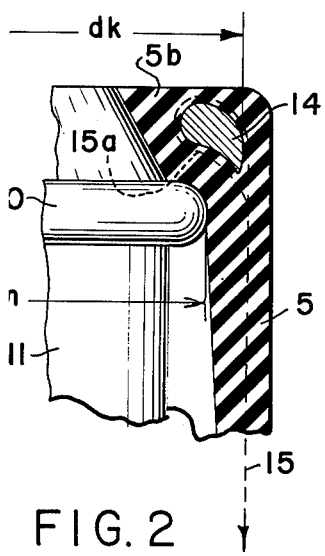
FIG. 2 shows on a larger scale than FIG. 1 that portion of the latter which is encircled by a dot-dash line III.
Figure 3:
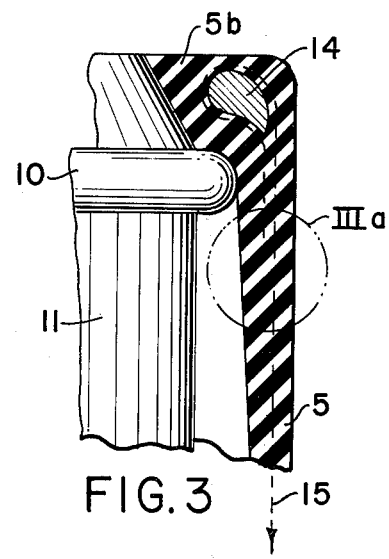
FIG. 3 is a section similar to that of FIG. 2, but represents a slight modification thereover.
Figure 3A:
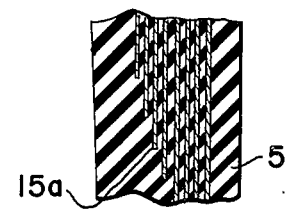
FIG. 3a is an enlarged section of the encircled portion IIIa of FIG. 3.

The essential structural details with regard to the construction and the holding of the spring bellows 5 within the range of the smaller bead ring 5b are clearly shown in FIGS. 2 and 3. The bead ring comprises a pull-resistant core ring 14 which is composed of a greater number of metallic wires which are bundled together. The core ring is on all sides embedded by rubber of the bead ring. The outer diameter $d_k$ of the core ring is, in all instances, greater than the outer diameter $d_h$ of the rim horn 10. The core ring forms an anchor for the strength carriers 15 which are arranged between the two bead rings 5a, 5b in the bellows wall. These strength carriers 15 are in the form of a loop passed around the core ring and have their free ends folded back in the direction toward the bellows body.

According to FIG. 2, the threads 15 are passed around the core ring 14 toward the outside, while their free ends 15a are located on that side which faces the rim horn 10, and more specifically, are arranged in the range where the bead ring merges with the bellows body.

The connection between the strength carriers 15 and the metallic core ring 14 may be improved by a frictional connection by means of an adhesive or cement. A further improvement has been realized with the embodiment according to FIG. 3. According to this embodiment the thread ends 15a are combined to group or layers with different longitudinal steps and are introduced into the bellows wall, as is clearly evident from the drawing.

The core ring illustrated in FIGS. 2 and 3 provides a form illustrated in cross section which results therefrom when two intersecting tangents are placed against a circle, whereby these tangents on the other hand form segments or cutouts of a circular line. There results thereby cross-sectional form comparable to a compacted support surface of an aircraft. The rounded edge is directed with the core ring toward the middle axis while the sharply outwardly extending edge is directed away from the middle axis of the core ring 14 in an angle of approximately 45°.

Figure 4:
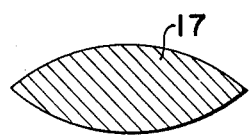
FIGS. 4, 5 and 6 are enlarged cross-sectional views of modified forms of core rings used in the structure of FIGS. 1 to 3.

According to FIG. 4, the core ring 17 also can provide such a cross-sectional form as results when two circular lines intersect each other, and the superimposed circular surfaces form a configuration having two corners. According to FIG. 5, the cross sectional surface also can be embodied to be elliptical. A further variation is represented by FIG. 6 wherein the cross sectional form is formed by way of a circular ring sector with edges rounded off in a circular form.

Figure 5:
Figure 6:
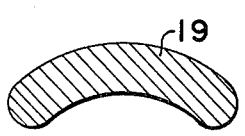

The core rings 17, 18 and 19 respectively represented in the FIGS. 4, 5 and 6 are so arranged in a circular ring that the middle axes thereof which lie at right angles to the drawing are parallel to the middle axes of the core rings 17, 18 and 19 respectively.

It is, of course, to be understood that the present invention is, by no means, limited to the particular showing in the drawing, but also comprises any modifications within the scope of the appended claims.

What we claim is:

1. For use in connection with a rail vehicle having a vehicle body and bogie including an upright supporting body and also having two abutment rings respectively fixedly connected to said vehicle body and on said upright supporting body on said bogie and spaced below the top of said body, an air spring bellows for hanging insertion between and connection to said abutment rings, which includes in combination: a hollow body of revolution of elastomeric material which cross-sectionally has a continuous curvature displaced in small increments, said hollow body having a first opening defined by a first annular bead integral with said hollow body for connection to one of said abutment rings, and also having a second opening opposite said first opening and defined by a second annular bead integral with said hollow body for connection to the other one of said abutment rings, two bead core rings respectively embedded in said first and second beads, strength members extending linearly in force direction first radially and then axially from bead to bead to take up freely forces without bending away with a load of the core ring, one of said beads having a shorter diameter than the other bead mounted on said upright supporting body and resting on the abutment ring on said body, the core ring embedded in the shorter diameter bead having an internal diameter less than the diameter of said abutment ring on said body and an external diameter exceeding the outer diameter of said abutment ring on said body, the free ends of said strength members in said shorter diameter bead being folded lying over said last mentioned bead on that side thereof which faces in the direction toward the abutment ring to which said smaller diameter bead is to be connected, said strength members being bonded to the respective adjacent bead ring, the free ends of said strength members after being looped around the pertaining beads extending in groups into the wall of said bellows, said wall extending downwardly from said smaller diameter bead, the said strength members differing from each other in length and having their free ends arranged to be staggered.

* * * * *